US012811487B2

(12) United States Patent
Wu et al.

(10) Patent No.: US 12,811,487 B2
(45) Date of Patent: Nov. 24, 2026

(54) POWER CONVERSION SYSTEM AND CONTROL METHOD

(71) Applicant: Reed Semiconductor Corporation, Warwick, RI (US)

(72) Inventors: Wenkai Wu, East Greenwich, RI (US); Weidong Zhu, East Lyme, CT (US); Cheng-Wei Chen, East Greenwich, RI (US)

(73) Assignee: Reed Semiconductor Corporation, Warwick, RI (US)

( * ) Notice: Subject to any disclaimer, the term of this patent is extended or adjusted under 35 U.S.C. 154(b) by 192 days.

(21) Appl. No.: 18/675,894

(22) Filed: May 28, 2024

(65) Prior Publication Data

US 2025/0373158 A1 Dec. 4, 2025

(51) Int. Cl.
*H02M 3/158* (2006.01)
*H02M 1/00* (2006.01)
*H02M 1/32* (2007.01)

(52) U.S. Cl.
CPC ........... *H02M 1/007* (2021.05); *H02M 1/327* (2021.05); *H02M 1/0095* (2021.05)

(58) Field of Classification Search
CPC .................................................... H02M 1/007
See application file for complete search history.

(56) References Cited

U.S. PATENT DOCUMENTS

| | | | | |
|---|---|---|---|---|
| 9,214,858 | B2 * | 12/2015 | Holmberg | H02M 3/158 |
| 2005/0219883 | A1 * | 10/2005 | Maple | H02M 3/1588 363/178 |
| 2009/0016085 | A1 * | 1/2009 | Rader | H02M 3/07 363/79 |
| 2017/0310227 | A1 * | 10/2017 | Zhang | H02M 3/1584 |
| 2020/0204071 | A1 * | 6/2020 | Huang | H02M 3/07 |
| 2021/0135583 | A1 * | 5/2021 | Ohashi | H02M 3/33573 |
| 2023/0396144 | A1 * | 12/2023 | Ge | H02M 3/07 |

OTHER PUBLICATIONS

R. Roy and S. Kapat, "Discrete-Time Framework for Analysis and Design of Digitally Current-Mode-Controlled Intermediate Bus Architectures for Fast Transient and Stability," in IEEE Journal of Emerging and Selected Topics in Power Electronics, vol. 8, No. 4, pp. 3237-3249, Dec. 2020 (Year: 2020).*

* cited by examiner

*Primary Examiner* — Peter M Novak
(74) *Attorney, Agent, or Firm* — AP3 Law Firm PLLC

(57) ABSTRACT

A method includes providing a power conversion system comprising a first power conversion apparatus connected between an input voltage bus and an intermediate voltage bus, and a second power conversion apparatus connected between the intermediate voltage bus and an output voltage bus, detecting a plurality of operating parameters of the power conversion system, and dynamically adjusting a voltage on the intermediate voltage bus based on the plurality of operating parameters so as to improve at least one desirable circuit characteristic of the power conversion system.

17 Claims, 5 Drawing Sheets

POWER CONVERSION SYSTEM AND CONTROL METHOD

TECHNICAL FIELD

The present disclosure relates generally to the field of power conversion systems, and in particular embodiments, to techniques and mechanisms for a high efficiency power conversion system and the associated control methods.

BACKGROUND

A power conversion system typically involves multiple stages to convert electrical power from the utility grid into the precise and reliable power required by data center equipment. Specifically, the power conversion system includes both AC/DC and DC/DC stages. With the rapid increase in cloud computing, artificial intelligence (AI) applications, and high-power processors, a power conversion system must provide high power densities to accommodate a growing range of processors that require higher current levels for efficient operation. These processors include graphics processing units (GPUs), tensor processing units (TPUs), and networking application-specific integrated circuits (ASICs) and the like.

The traditional power distribution bus (e.g., a 12-V voltage bus) cannot meet these increasing power requirements. More efficient power management solutions at the architectural level are inevitable. One effective way to improve power delivery is to transition from the traditional distribution bus (e.g., a 12-V voltage bus) to a higher voltage bus (e.g., a 48-V voltage bus). This new architecture significantly improves overall system efficiency. However, the 48-V voltage bus presents significant challenges for the voltage regulator modules (VRMs) required to power the processors. For example, a buck converter operating with the 48-V voltage bus and stepping down to sub-1V will experience significant switching losses, resulting in lower overall system efficiency.

Two-stage conversions can help address the design challenges associated with the 48-V voltage bus. A two-stage power conversion system comprises a first power stage and a second power stage connected in cascade between an input power source and a load. The first power stage can be implemented using various suitable power converters, such as an inductor-inductor-capacitor (LLC) resonant converter, a switched capacitor converter, a hybrid switched capacitor converter, a full-bridge power converter, a half-bridge power converter, a buck converter, or any combination thereof. This first power stage converts the voltage on the 48-V voltage bus to a specific intermediate bus voltage (e.g., a 12-V intermediate bus). The second power stage is then implemented as a suitable power converter such as a buck converter, a multi-phase buck converter and the like. The second power stage is employed to provide power for the processor (e.g., a central processing unit).

The two-stage power architecture offers a variety of advantages. For instance, it is inherently simpler and can be more reliable. However, each stage of the two-stage power architecture involves inherent inefficiencies. Even with high-efficiency power converters, some power is always lost as heat. The cumulative effect of these losses across multiple stages can reduce overall system efficiency. Therefore, it is desirable to improve the system efficiency of the two-stage power architecture. The present disclosure addresses this need.

SUMMARY

Technical advantages are generally achieved, by embodiments of this disclosure which describe a high efficiency power conversion system and the associated control methods.

In accordance with one aspect of the present disclosure, a method comprises providing a power conversion system comprising a first power conversion apparatus connected between an input voltage bus and an intermediate voltage bus, and a second power conversion apparatus connected between the intermediate voltage bus and an output voltage bus, detecting a plurality of operating parameters of the power conversion system, and dynamically adjusting a voltage on the intermediate voltage bus based on the plurality of operating parameters so as to improve at least one desirable circuit characteristic of the power conversion system.

In accordance with another aspect of the present disclosure, a method comprises detecting a plurality of operating parameters of a power conversion system comprising a first power conversion apparatus and a second power conversion apparatus connected in cascade, and dynamically adjusting a voltage on the intermediate voltage bus of the power conversion system based on the plurality of operating parameters to enhance at least one desirable circuit characteristic of the power conversion system.

In accordance with another aspect of the present disclosure, a power conversion system comprises a first power conversion apparatus connected between an input voltage bus and an intermediate voltage bus, a second power conversion apparatus connected between the intermediate voltage bus and an output voltage bus, and a control circuit configured to detect a plurality of operating parameters of the power conversion system, and dynamically adjust a voltage on the intermediate voltage bus based on the plurality of operating parameters so as to improve at least one desirable circuit characteristic of the power conversion system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Further, one or more features from one or more of the following described embodiments may be combined to create alternative embodiments not explicitly described, and features suitable for such combinations are understood to be within the scope of this disclosure. It is therefore intended that the appended claims encompass any such modifications or embodiments.

The present disclosure will be described with respect to embodiments in a specific context, namely a high efficiency power conversion system and the associated control methods. The disclosure may also be applied, however, to a variety of power conversions systems. Hereinafter, various embodiments will be explained in detail with reference to the accompanying drawings.

Figure 1:
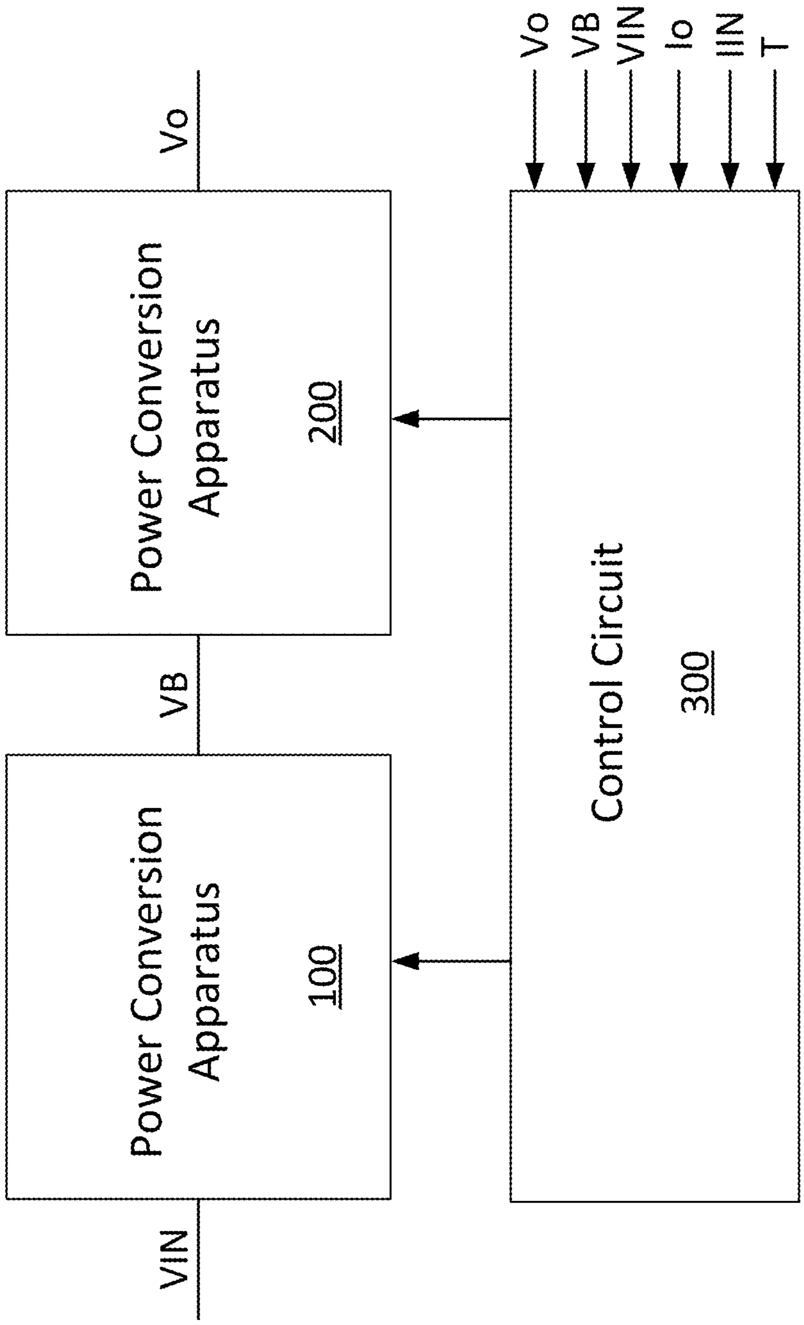
FIG. 1 illustrates a block diagram of a power conversion system in accordance with various embodiments of the present disclosure.

FIG. 1 illustrates a block diagram of a power conversion system in accordance with various embodiments of the present disclosure. The power conversion system comprises a first power conversion apparatus 100, a second power conversion apparatus 200 and a control circuit 300. As shown in FIG. 1, the first power conversion apparatus 100 and the second power conversion apparatus 200 are connected in cascade between an input voltage bus VIN and an output voltage bus Vo. More particularly, the first power conversion apparatus 100 is connected between the input voltage bus VIN and an intermediate voltage bus VB. The second power conversion apparatus 200 is connected between the intermediate voltage bus VB and the output voltage bus Vo. A load (not shown) is coupled to the output voltage bus Vo. In some embodiments, the load may be a processor (e.g., a central processing unit).

As shown in FIG. 1, the control circuit 300 is coupled to both the first power conversion apparatus 100 and the second power conversion apparatus 200. In particular, the control circuit 300 is configured to generate a plurality of gate drive signals for controlling the first power conversion apparatus 100 and the second power conversion apparatus 200. In operation, based on various operating parameters, the control circuit 300 generates gate drive signals for the first power conversion apparatus 100 so as to adjust the voltage on the intermediate voltage bus VB. Likewise, the control circuit 300 generates gate drive signals for the second power conversion apparatus 200 so as to regulate the voltage on the output voltage bus Vo.

In some embodiments, the voltage on the input voltage bus VIN is equal to 48 V. The voltage on the intermediate voltage bus VB is equal to 12 V. The voltage on the intermediate voltage bus VB may vary in a wide range depending on different operation conditions and design needs. The voltage on the output voltage bus Vo is in a range from about 0.6 V to about 1.0 V.

It should be noted that the voltage values used above are selected purely for demonstration purposes and are not intended to limit the various embodiments of the present disclosure to any particular voltage values. One of ordinary skill in the art would recognize many variations, alternatives, and modifications. For example, for some applications, the voltage on the input voltage bus VIN is equal to 400 V.

In some embodiments, the first power conversion apparatus 100 is implemented as a hybrid switched capacitor power converter. The detailed structure and operating principle of the hybrid switched capacitor power converter will be discussed below with respect to FIG. 2. Alternatively, the first power conversion apparatus 100 may be implemented as any suitable power converters such as an LLC converter, a switched capacitor converter, a hybrid switched capacitor converter, a full bridge power converter, a half bridge power converter, a buck converter, any combinations thereof and the like. In some embodiments, the second power conversion apparatus 200 is implemented as a step-down power converter. The step-down power converter is known as a buck converter. The detailed structure and operating principle of the step-down power converter will be discussed below with respect to FIG. 3.

In some embodiments, the control circuit 300 may be a system controller or a system control apparatus. The control circuit 300 may be implemented as a microprocessor, a digital signal processor and the like.

As shown in FIG. 1, the control circuit 300 is configured to detect a plurality of operating parameters of the power conversion system. The plurality of operating parameters includes the voltage on the output voltage bus Vo, the voltage on the intermediate voltage bus VB, the voltage on the input voltage bus VIN, the current (Io) flowing through the output voltage bus, the current (IIN) flowing through the input voltage bus, various temperatures on different power components of the power conversion system and any other suitable operating parameters. The control circuit 300 is able to dynamically adjust the voltage on the intermediate voltage bus VB based on the plurality of operating parameters so as to improve at least one desirable circuit characteristic of the power conversion system.

In a first implementation of the control circuit 300, the control circuit 300 is configured to detect the plurality of operating parameters including the voltage on the input voltage bus VIN, the current (IIN) flowing through the input voltage bus, the voltage on the output voltage bus Vo and the current (Io) flowing through the output voltage bus. Based on these operating parameters, the control circuit 300 is configured to calculate the efficiency of the power conversion system. Furthermore, based on the calculated efficiency, the control circuit 300 is able to dynamically adjust the voltage on the intermediate voltage bus VB in a trial-and-error approach to improve the efficiency of the power conversion system. For example, the control circuit 300 may start by selecting an initial value for the voltage on the intermediate voltage bus VB and calculating the efficiency at this initial value. Next, the control circuit 300 adjusts the voltage on the intermediate voltage bus VB in one direction (e.g., increasing the voltage on the intermediate voltage bus VB) and calculates the efficiency again. The control circuit 300 then compares the newly measured efficiency with the initial efficiency to determine whether the adjustment direction leads to improvement. This process is repeated, iteratively adjusting the voltage and comparing efficiencies, until the improved and/or desirable efficiency is achieved.

In some embodiments, the first power conversion apparatus 100 is implemented as a hybrid switched capacitor power converter. The output voltage of the hybrid switched capacitor converter can be regulated to a predetermined voltage through duty cycle control. In operation, the control circuit 300 adjusts the duty cycle of the hybrid switched capacitor power converter to achieve a desirable voltage on the intermediate voltage bus, thereby enhancing the efficiency of the power conversion system.

In a second implementation of the control circuit 300, the control circuit 300 is configured to detect the plurality of operating parameters including the load current and/or the output voltage applied to the load. In response to an increase in load, the control circuit 300 is able to dynamically increase the voltage on the intermediate voltage bus VB to increase the input voltage supplied to the second conversion apparatus 200, aiming to restore the output voltage to its desired level in a load transient, thereby improving the load transient response of the power conversion system. On the other hand, in response to a decrease in load, the control circuit 300 is able to dynamically reduce the voltage on the intermediate voltage bus VB to decrease the input voltage supplied to the second conversion apparatus 200, aiming to bring the output voltage back to its desired level in the load transient, thereby improving the load transient response of the power conversion system.

In some embodiments, the voltage adjustment on the intermediate voltage bus VB is proportional to the load change. For example, in response to an increase in load, the voltage increase on the intermediate voltage bus VB is equal to the load change times a predetermined coefficient.

In a third implementation of the control circuit 300, the control circuit 300 is configured to detect the plurality of operating parameters including a hotspot temperature of the first power conversion apparatus 100 and a hotspot temperature of the second power conversion apparatus 200. The hotspot temperature refers to the highest temperature observed within a power converter during operation. This temperature typically occurs at a specific location, such as a power switch or a magnetic component.

Once the hotspot temperature of the first power conversion apparatus 100 and the hotspot temperature of the second power conversion apparatus 200 have been identified, the control circuit 300 is able to dynamically adjust the voltage on the intermediate voltage bus VB so that the hotspot temperature of the first power conversion apparatus is equal to the hotspot temperature of the second power conversion apparatus, thereby achieving a uniform thermal distribution in the power conversion system.

A uniform thermal distribution in the power conversion system offers several significant advantages such as improved reliability, enhanced efficiency, extended component lifespan, safety improvements and design flexibility.

In a fourth implementation of the control circuit 300, the control circuit 300 is configured to detect the plurality of operating parameters including the voltage on the input voltage bus VIN, the current (IIN) flowing through the input voltage bus, the voltage on the output voltage bus Vo and the current (Io) flowing through the output voltage bus. Based on these operating parameters, the control circuit 300 is configured to calculate the efficiency of the power conversion system. Furthermore, the control circuit 300 is able to dynamically adjust the voltage on the intermediate voltage bus in a trial-and-error approach to improve the efficiency of the power conversion system. In response to an increase of the voltage on the intermediate voltage bus VB, the control circuit 300 is configured to increase a switching frequency of the second power conversion apparatus 200 so as to maintain a consistent output voltage ripple at the output voltage bus Vo. On the other hand, in response to a decrease of the voltage on the intermediate voltage bus VB, the control circuit 300 is configured to reduce a switching frequency of the second power conversion apparatus 200 so as to lower switching power losses of the second power conversion apparatus 200.

In a fifth implementation of the control circuit 300, the control circuit 300 is configured to detect the plurality of operating parameters including the voltage on the input voltage bus VIN, the current (IIN) flowing through the input voltage bus, the voltage on the output voltage bus Vo and the current (Io) flowing through the output voltage bus. Based on these operating parameters, the control circuit 300 is configured to calculate the efficiency of the power conversion system. Furthermore, the control circuit 300 is able to dynamically adjust the voltage on the intermediate voltage bus in a trial-and-error approach to improve the efficiency of the power conversion system. In response to the voltage on the intermediate voltage bus VB rising to a level close to the voltage on the input voltage bus VIN, the control circuit 300 configures one power switch of the first power conversion apparatus 100 to operate in a linear mode where the one power switch of the first power conversion apparatus 100 functions as a variable resistor to regulate the voltage on the intermediate voltage bus VB. On the other hand, in response to the voltage on the intermediate voltage bus VB dropping to a level close to the voltage on the output voltage bus Vo, the control circuit 300 configures one power switch of the second power conversion apparatus 200 to operate in a linear mode where the one power switch of the second power conversion apparatus 200 functions as a variable resistor to regulate the voltage on the output voltage bus Vo.

In some embodiments, the power conversion system is configured to operate in a light load condition. The switching losses are dominant losses. The switched voltage of the second power conversion apparatus 200 plays a crucial role in determining the switching losses. Therefore, it is desirable to have a lower voltage on the intermediate voltage bus VB when the power conversion system is configured to operate in the light load condition. On the other hand, when the power conversion system is configured to operate in a heavy load condition, the conduction losses become the predominant type of loss. An increased voltage on the intermediate voltage bus VB results in a reduced current flowing into the second power conversion apparatus 200. This reduction in current helps to minimize the conduction losses.

In a sixth implementation of the control circuit 300, the control circuit 300 is configured to detect the plurality of operating parameters including the load current. In response to a light load condition, the control circuit 300 is able to dynamically reduce the voltage on the intermediate voltage bus VB, thereby reducing the switching losses of the second power conversion apparatus 200. On the other hand, in response to a heavy load condition, the control circuit 300 is able to dynamically increase the voltage on the intermediate voltage bus VB, thereby reducing the conduction losses of the second power conversion apparatus 200.

In a seventh implementation of the control circuit 300, the control circuit 300 is configured to establish an upper voltage limit and/or a lower voltage limit for the voltage on the intermediate voltage bus VB. In operation, depending on different operating conditions, the control circuit 300 is able to dynamically increase the voltage on the intermediate voltage bus VB until the voltage on the intermediate voltage bus VB reaches the upper voltage limit. On the other hand, depending on different operating conditions, the control circuit 300 is able to dynamically reduce the voltage on the intermediate voltage bus VB until the voltage on the intermediate voltage bus VB reaches the lower voltage limit. It should be noted that the seventh implementation of the control circuit 300 can be combined with any of the previously mentioned implementations.

In various embodiments, the different implementations of the control circuit 300 described above can be combined in any suitable manner. For example, the first implementation (adjusting the voltage on the intermediate voltage bus VB to improve efficiency) can be used on or in conjunction with the third implementation (adjusting the voltage on the intermediate voltage bus VB to improve thermal management) to yield a further embodiment. In some embodiments, the first implementation and the third implementation of the control circuit 300 are carried out in an alternating manner to further improve the performance of the power conversion system.

Figure 2:
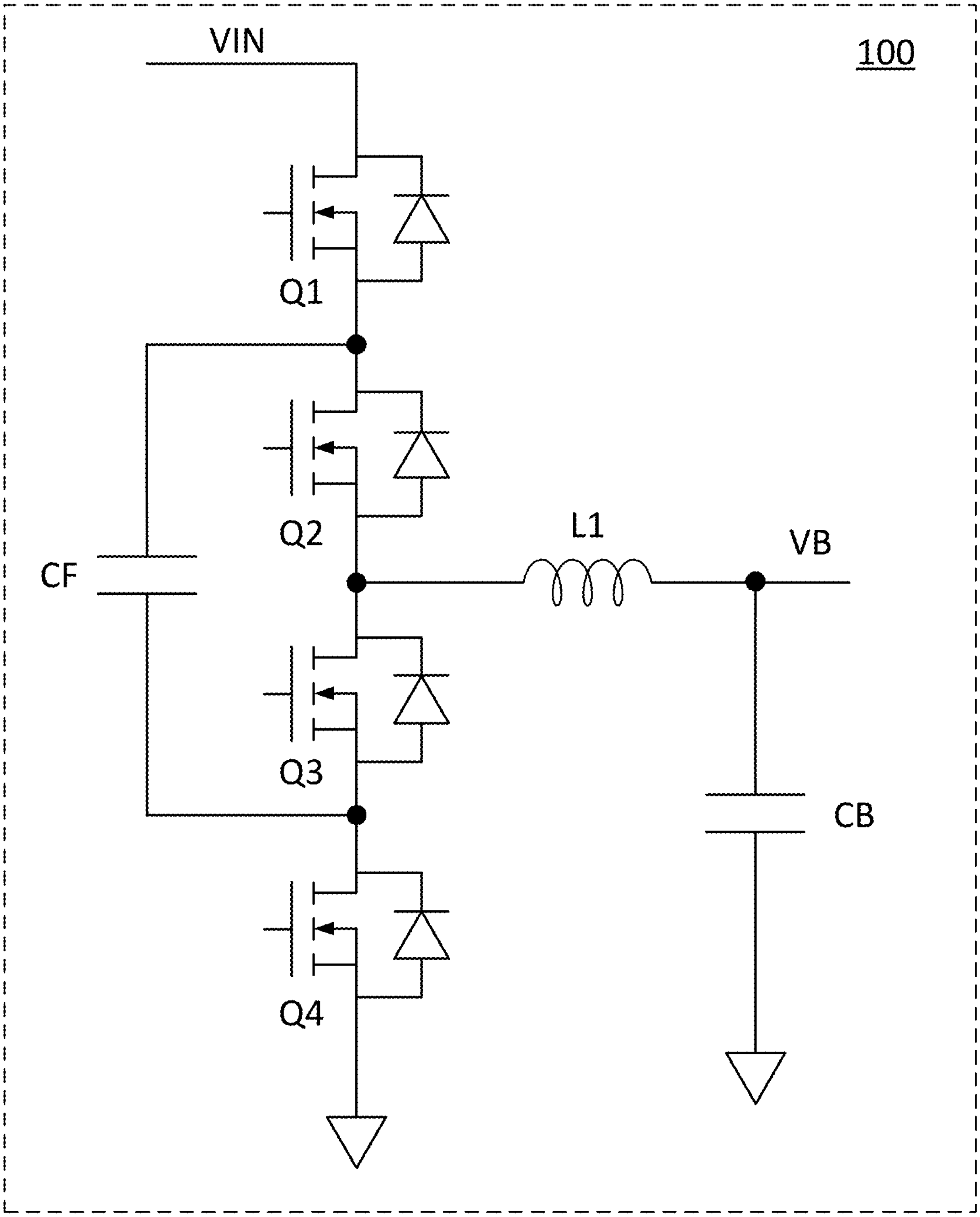
FIG. 2 illustrates a schematic diagram of the first power conversion apparatus shown in FIG. 1 in accordance with various embodiments of the present disclosure.

FIG. 2 illustrates a schematic diagram of the first power conversion apparatus shown in FIG. 1 in accordance with various embodiments of the present disclosure. The first power conversion apparatus 100 is implemented as a hybrid switched capacitor converter. The hybrid switched capacitor converter comprises a first switch Q1, a second switch Q2, a third switch Q3 and a fourth switch Q4 connected in series between the input voltage bus VIN and ground. A flying capacitor CF is connected between a common node of the first switch Q1 and the second switch Q2, and a common node of the third switch Q3 and the fourth switch Q4. An inductor L1 is connected between a common node of the second switch Q2 and the third switch Q3, and the intermediate voltage bus VB. A capacitor CB is connected between the intermediate voltage bus VB and ground.

In some embodiments, the hybrid switched capacitor converter shown in FIG. 2 functions as a three-level buck converter. The hybrid switched capacitor converter can achieve output voltage regulation through pulse width modulation (PWM) duty cycle control. In operation, the first switch Q1 and the second switch Q2 have the same duty ratio. There is a 180-degree phase shift between the leading edge of the gate drive signal of the first switch Q1 and the leading edge of the gate drive signal of the second switch Q2. The fourth switch Q4 operates complementarily to the first switch Q1. The third switch Q3 operates complementarily to the second switch Q2. In operation, the flying capacitor CF creates one more voltage level at one half of VIN. In other words, the hybrid switched capacitor converter has three voltage levels, namely VIN, VIN/2 and zero.

In some embodiments, the hybrid switched capacitor converter operates in four different phases. In a first phase, the first switch Q1 and the second switch Q2 are turned on, and the third switch Q3 and the fourth switch Q4 are turned off. The difference between the input voltage VIN and the output voltage Vo is applied to the inductor L1. The current flowing through the inductor L1 ramps up. In a second phase, the first switch Q1 and the third switch Q3 are turned on, and the second switch Q2 and the fourth switch Q4 are turned off. The difference between the input voltage VIN and the voltage across the flying capacitor is applied to a first terminal of the inductor L1. The output voltage Vo is applied to a second terminal of the inductor L1. The current flowing through the inductor L1 ramps down.

In a third phase, the first switch Q1 and the second switch Q2 are turned on, and the third switch Q3 and the fourth switch Q4 are turned off. The difference between the input voltage VIN and the output voltage Vo is applied to the inductor L1. The current flowing through the inductor L1 ramps up. In a fourth phase, the fourth switch Q4 and the second switch Q2 are turned on, and the third switch Q3 and the first switch Q1 are turned off. The difference between the voltage across the flying capacitor CF and the output voltage Vo is applied to the inductor L1. The current flowing through the inductor L1 ramps down.

In each phase, the current flowing through the inductor L1 may ramp up or down depending on different combinations of the input voltage VIN, the voltage across the charge pump capacitor CF and the output voltage Vo. The voltage of the hybrid switched capacitor converter can be regulated to a predetermined voltage through adjusting the duty cycle of the hybrid switched capacitor converter.

In some embodiments, the hybrid switched capacitor converter may operating in a hybrid mode having four different phases. In a first phase of the hybrid mode, the first switch Q1 and the third switch Q3 are turned on, and the second switch Q2 and the fourth switch Q4 are turned off. During the first phase of the hybrid mode, the flying capacitor CF is charged and energy is stored in the flying capacitor CF accordingly. The current flowing through the inductor Li may ramp up or down depending on the voltage applied across the inductor L1. In some embodiments, when the input voltage VIN is greater than the sum of the voltage across the flying capacitor CF and the output voltage Vo, the current flowing through the inductor L1 ramps up and the energy stored in the inductor L1 increases accordingly. In a second phase of the hybrid mode, the first switch Q1 and the second switch Q2 are turned off, and the third switch Q3 and the fourth switch Q4 are turned on. During the second phase of the hybrid mode, the flying capacitor CF is isolated by the turned-off switches Q1 and Q2. The current flowing through the inductor L1 ramps down and the energy stored in the inductor L1 decreases accordingly.

In a third phase of the hybrid mode, the first switch Q1 and the third switch Q3 are turned off, and the second switch Q2 and the fourth switch Q4 are turned on. During the third phase of the hybrid mode, the current discharges the flying capacitor CF and the energy stored in the flying capacitor CF decreases accordingly. In some embodiments, the current flowing through the inductor L1 may ramp up and the energy stored in the inductor L1 increases accordingly. In a fourth phase of the hybrid mode, the first switch Q1 and the second switch Q2 are turned off, and the third switch Q3 and the fourth switch Q4 are turned on. During the fourth phase of the hybrid mode, the flying capacitor CF is isolated by the turned-off switches Q1 and Q2. The current flowing through the inductor L1 ramps down and the energy stored in the inductor L1 decreases accordingly.

In each phase of the hybrid mode, the current flowing through the inductor L1 may ramp up or down depending on different combinations of the input voltage VIN, the voltage across the charge pump capacitor CF and the output voltage Vo. The voltage of the hybrid switched capacitor converter can be regulated to a predetermined voltage through adjusting the duty cycle of the hybrid switched capacitor converter.

In some embodiments, the hybrid switched capacitor converter may operating in a buck mode having two different phases. The second switch Q2 and the third switch Q3 are configured as always-on switches. As a result, the flying capacitor CF is shorted and not part of the operation of the buck mode. The hybrid switched capacitor converter functions as a buck converter. In each phase, the current flowing through the output inductor L1 may ramp up or down depending on different combinations of the input voltage VIN and the output voltage Vo. The voltage of the hybrid switched capacitor converter can be regulated to a predetermined voltage through adjusting the duty cycle of the hybrid switched capacitor converter.

In accordance with an embodiment, the switches (e.g., switches Q1-Q4) may be metal oxide semiconductor field-effect transistor (MOSFET) devices. Alternatively, the switches can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN)-based power devices, silicon carbide (SiC)-based power devices and the like.

It should be noted while FIG. 2 shows the switches Q1-Q4 are implemented as single n-type transistors, a person skilled in the art would recognize there may be many variations, modifications and alternatives. For example, depending on different applications and design needs, the switches Q1-Q4 may be implemented as p-type transistors. Furthermore, each switch shown in FIG. 2 may be implemented as a plurality of switches connected in parallel. Moreover, a capacitor may be connected in parallel with one switch to achieve zero voltage switching (ZVS)/zero current switching (ZCS).

Figure 3:
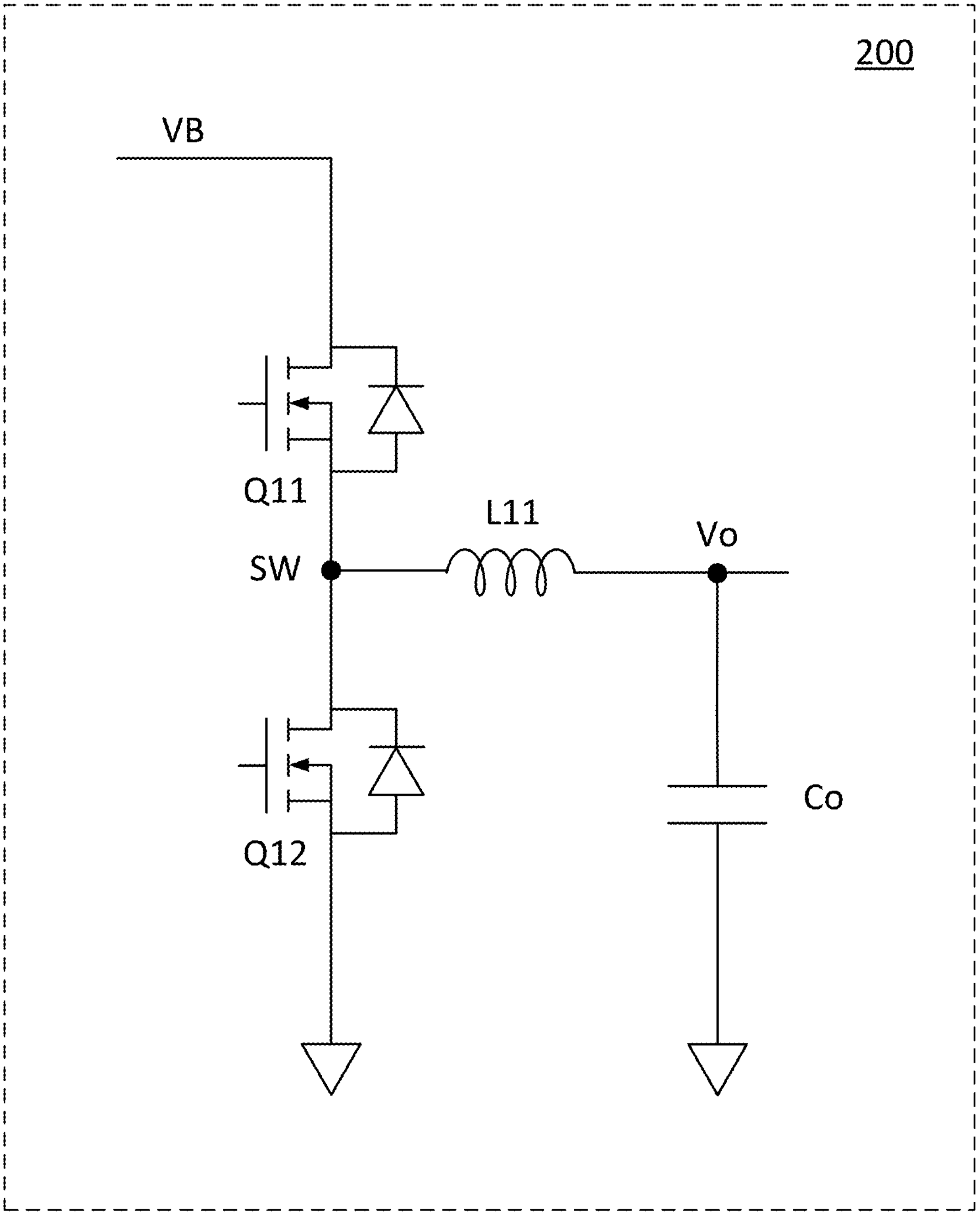
FIG. 3 illustrates a schematic diagram of the second power conversion apparatus shown in FIG. 1 in accordance with various embodiments of the present disclosure.

FIG. 3 illustrates a schematic diagram of the second power conversion apparatus shown in FIG. 1 in accordance with various embodiments of the present disclosure. The second power conversion apparatus 200 is implemented as a buck converter. As shown in FIG. 3, the buck converter comprises a high-side switch Q11 and a low-side switch Q12 connected in series between the intermediate voltage bus VB and ground. An output inductor L11 is connected between a common node of the high-side switch Q11 and the low-side switch Q12, and the output voltage bus Vo. An output capacitor Co is connected between the output voltage bus Vo and ground.

In operation, when the high-side switch Q11 is turned on, and the low-side switch Q12 is turned off, a current flows from the input voltage VIN to the load through the output inductor L11. The output inductor L11 opposes sudden changes in current by storing energy in its magnetic field. The output capacitor Co supplies the load with current, smoothing out the output voltage Vo. When the high-side switch Q11 is turned off, and the low-side switch Q12 is turned on, the output inductor L11 releases its stored energy to maintain the current flow to the load. The output capacitor Co continues to smooth the output voltage. In operation, the duty cycle (the ratio of the turn-on time of the high-side switch Q11 to the total switching period) is used to control the output voltage Vo. By adjusting the duty cycle, the output voltage Vo can be regulated at a predetermined level.

Figure 4:
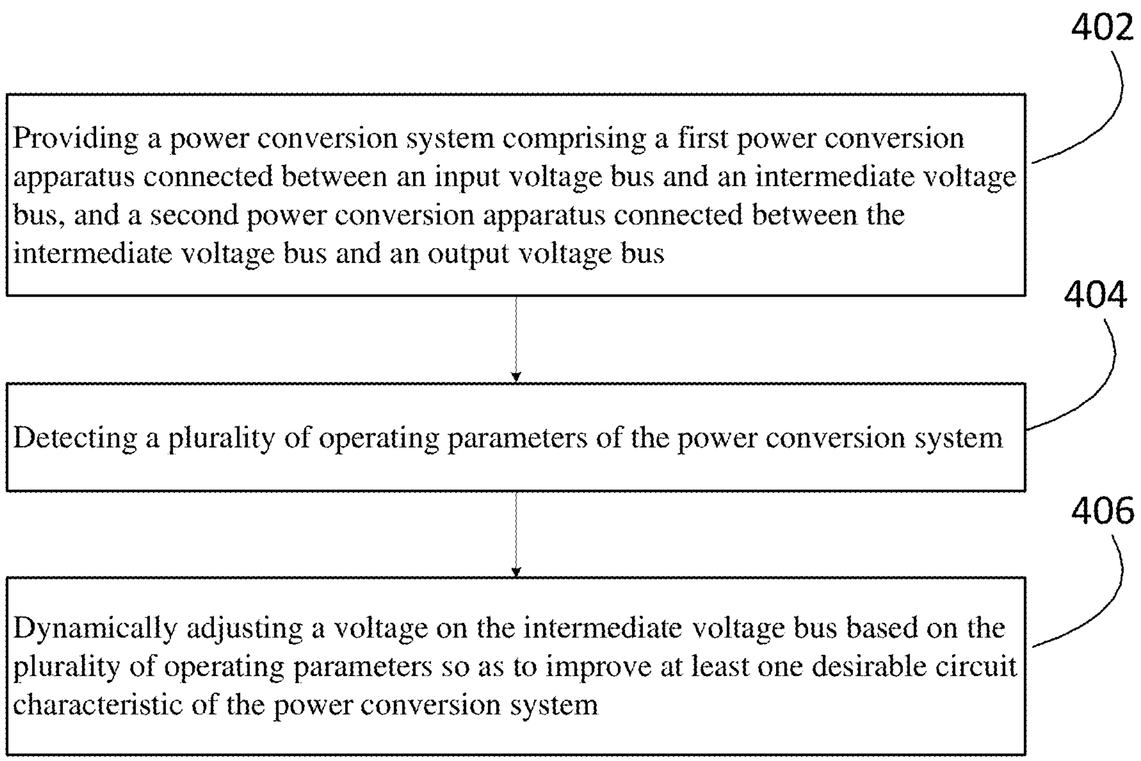
FIG. 4 illustrates a flow chart of a first method for controlling the power conversion system shown in FIG. 1 in accordance with various embodiments of the present disclosure.

FIG. 4 illustrates a flow chart of a first method for controlling the power conversion system shown in FIG. 1 in accordance with various embodiments of the present disclosure. This flowchart shown in FIG. 4 is merely an example, which should not unduly limit the scope of the claims. One of ordinary skill in the art would recognize many variations, alternatives, and modifications. For example, various steps illustrated in FIG. 4 may be added, removed, replaced, rearranged and repeated.

At step 402, a power conversion system is provided. The power conversion system comprises a first power conversion apparatus connected between an input voltage bus and an intermediate voltage bus, and a second power conversion apparatus connected between the intermediate voltage bus and an output voltage bus.

At step 404, a plurality of operating parameters of the power conversion system is detected.

At step 406, a voltage on the intermediate voltage bus is dynamically adjusted based on the plurality of operating parameters so as to improve at least one desirable circuit characteristic of the power conversion system.

The method further comprises detecting the plurality of operating parameters including a voltage on the input voltage bus, a current flowing through the input voltage bus, a voltage on the output voltage bus, a current flowing through the output voltage bus, calculating efficiency of the power conversion system based on the plurality of operating parameters, and dynamically adjusting the voltage on the intermediate voltage bus in a trial-and-error approach to improve the efficiency of the power conversion system.

The method further comprises detecting the plurality of operating parameters including a load current, and in response to an increase in load, dynamically increasing the voltage on the intermediate voltage bus to improve load transient response of the power conversion system.

The method further comprises detecting the plurality of operating parameters including a load current, and in response to a decrease in load, dynamically reducing the voltage on the intermediate voltage bus to improve load transient response of the power conversion system.

The method further comprises detecting the plurality of operating parameters including a hotspot temperature of the first power conversion apparatus and a hotspot temperature of the second power conversion apparatus, and dynamically adjusting the voltage on the intermediate voltage bus so that the hotspot temperature of the first power conversion apparatus is equal to the hotspot temperature of the second power conversion apparatus.

The method further comprises detecting the plurality of operating parameters including a voltage on the input voltage bus, a current flowing through the input voltage bus, a voltage on the output voltage bus, a current flowing through the output voltage bus, calculating efficiency of the power conversion system based on the plurality of operating parameters, dynamically adjusting the voltage on the intermediate voltage bus to improve the efficiency of the power conversion system, and in response to an increase of the voltage on the intermediate voltage bus, increasing a switching frequency of the second power conversion apparatus so as to maintain a consistent output voltage ripple.

The method further comprises detecting the plurality of operating parameters including a voltage on the input voltage bus, a current flowing through the input voltage bus, a voltage on the output voltage bus, a current flowing through the output voltage bus, calculating efficiency of the power conversion system based on the plurality of operating parameters, dynamically adjusting the voltage on the intermediate voltage bus to improve the efficiency of the power conversion system, and in response to a decrease of the voltage on the intermediate voltage bus, reducing a switching frequency of the second power conversion apparatus so as to lower switching power losses of the second power conversion apparatus.

The method further comprises detecting the plurality of operating parameters including a voltage on the input voltage bus, a current flowing through the input voltage bus, a voltage on the output voltage bus, a current flowing through the output voltage bus, calculating efficiency of the power conversion system based on the plurality of operating parameters, dynamically adjusting the voltage on the intermediate voltage bus to improve the efficiency of the power conversion system, and in response to the voltage on the intermediate voltage bus rising to a level close to the voltage on the input voltage bus, configuring one power switch of the first power conversion apparatus to operate in a linear mode where the one power switch of the first power conversion apparatus functions as a variable resistor to regulate the voltage on the intermediate voltage bus.

The method further comprises detecting the plurality of operating parameters including a voltage on the input voltage bus, a current flowing through the input voltage bus, a voltage on the output voltage bus, a current flowing through the output voltage bus, calculating efficiency of the power conversion system based on the plurality of operating parameters, dynamically adjusting the voltage on the intermediate voltage bus to improve the efficiency of the power conversion system, and in response to the voltage on the intermediate voltage bus dropping to a level close to the voltage on the output voltage bus, configuring one power switch of the second power conversion apparatus to operate in a linear mode where the one power switch of the second power conversion apparatus functions as a variable resistor to regulate the voltage on the output voltage bus.

In some embodiments, the first power conversion apparatus is a hybrid switched capacitor converter comprising a first switch, a second switch, a third switch and a fourth switch connected in series between the input voltage bus and ground, a flying capacitor connected between a common node of the first switch and the second switch, and a common node of the third switch and the fourth switch, an inductor connected between a common node of the second switch and the third switch, and the intermediate voltage bus, and a capacitor connected between the intermediate voltage bus and ground.

In some embodiments, the second power conversion apparatus is a buck converter comprising a high-side switch and a low-side switch connected in series between the intermediate voltage bus and ground, an output inductor connected between a common node of the high-side switch and the low-side switch, and the output voltage bus, and an output capacitor connected between the output voltage bus and ground.

Figure 5:
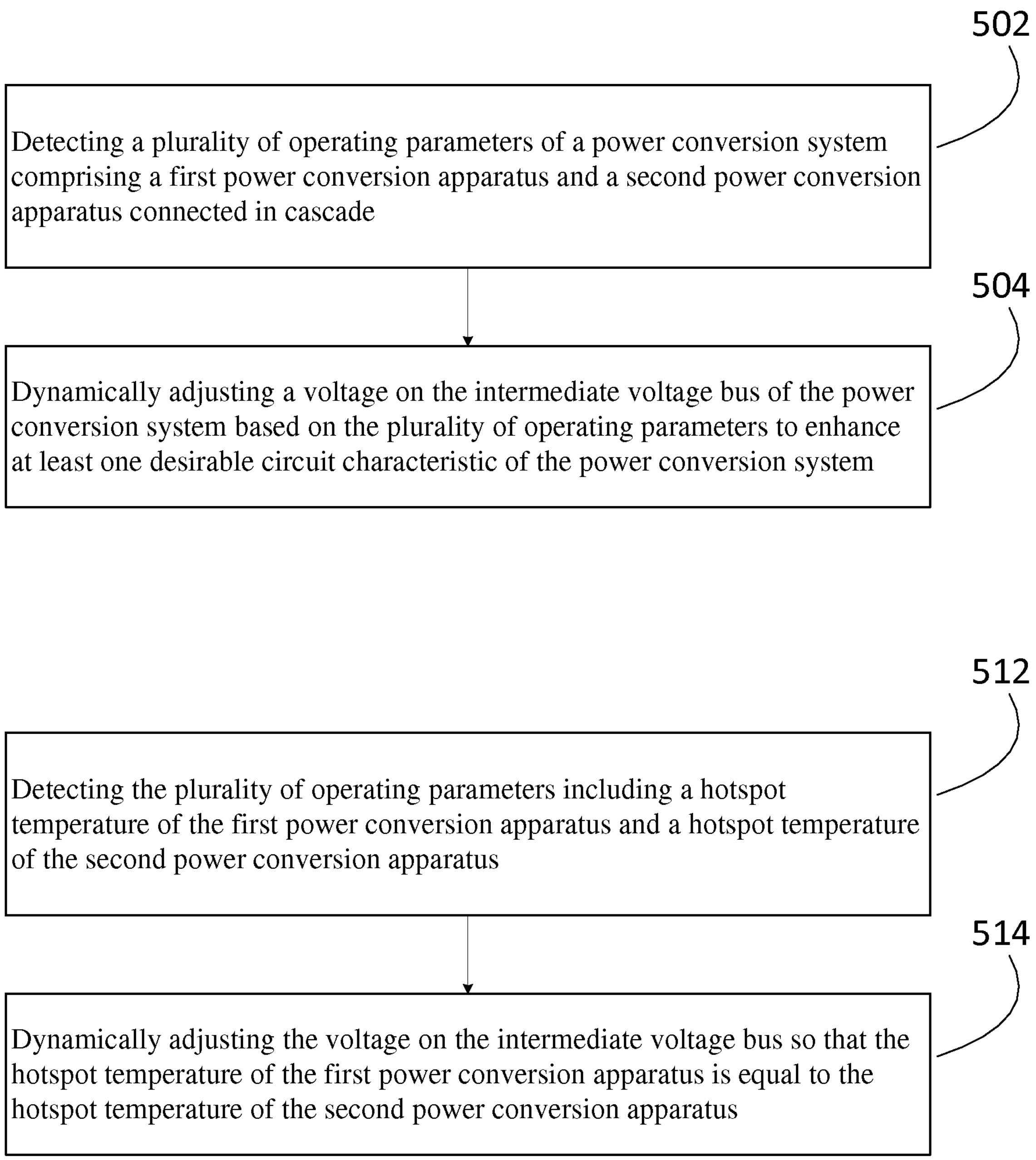
FIG. 5 illustrates a flow chart of a second method for controlling the power conversion system shown in FIG. 1 in accordance with various embodiments of the present disclosure.

FIG. 5 illustrates a flow chart of a second method for controlling the power conversion system shown in FIG. 1 in accordance with various embodiments of the present disclosure. This flowchart shown in FIG. 5 is merely an example, which should not unduly limit the scope of the claims. One of ordinary skill in the art would recognize many variations, alternatives, and modifications. For example, various steps illustrated in FIG. 5 may be added, removed, replaced, rearranged and repeated.

At step 502, a plurality of operating parameters of a power conversion system is detected. The power conversion system comprises a first power conversion apparatus and a second power conversion apparatus connected in cascade.

At step 504, a voltage on the intermediate voltage bus of the power conversion system is dynamically adjusted based on the plurality of operating parameters to enhance at least one desirable circuit characteristic of the power conversion system.

In some embodiments, the first power conversion apparatus is connected between an input voltage bus and the intermediate voltage bus, and the second power conversion apparatus is connected between the intermediate voltage bus and an output voltage bus.

In some embodiments, a voltage on the input voltage bus is equal to about 48 V; and a voltage on the output voltage bus is in a range from about 0.6 V to about 1 V.

The method further comprises calculating efficiency of the power conversion system based on the plurality of operating parameters, and dynamically adjusting the voltage on the intermediate voltage bus to improve the efficiency of the power conversion system.

The method further comprises detecting the plurality of operating parameters including a load current, and in response to a load transient, dynamically adjusting the voltage on the intermediate voltage bus to improve load transient response of the power conversion system.

In some embodiments, the first power conversion apparatus is a hybrid switched capacitor converter comprising a first switch, a second switch, a third switch and a fourth switch connected in series between the input voltage bus and ground, a flying capacitor connected between a common node of the first switch and the second switch, and a common node of the third switch and the fourth switch, an inductor connected between a common node of the second switch and the third switch, and the intermediate voltage bus, and a capacitor connected between the intermediate voltage bus and ground, and the second power conversion apparatus is a buck converter comprising a high-side switch and a low-side switch connected in series between the intermediate voltage bus and ground, an output inductor connected between a common node of the high-side switch and the low-side switch, and the output voltage bus, and an output capacitor connected between the output voltage bus and ground.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, which may perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, or steps.

What is claimed is:

1. A method comprising:

providing a power conversion system comprising a first power conversion apparatus connected between an input voltage bus and an intermediate voltage bus, and a second power conversion apparatus connected between the intermediate voltage bus and an output voltage bus;

detecting a plurality of operating parameters of the power conversion system; and dynamically adjusting a voltage on the intermediate voltage bus based on the plurality of operating parameters so as to improve at least one desirable circuit characteristic of the power conversion system, wherein during a load transient, the voltage on the intermediate voltage bus is dynamically adjusted in response to an increase in load, and a voltage increase on the intermediate voltage bus is equal to a load change multiplied by a predetermined coefficient.

2. The method of claim 1, further comprising:

detecting the plurality of operating parameters including a voltage on the input voltage bus, a current flowing through the input voltage bus, a voltage on the output voltage bus, a current flowing through the output voltage bus;

calculating efficiency of the power conversion system based on the plurality of operating parameters; and dynamically adjusting the voltage on the intermediate voltage bus in a trial-and-error approach to improve the efficiency of the power conversion system.

3. The method of claim 1, further comprising:

detecting the plurality of operating parameters including a load current; and in response to a decrease in load, dynamically reducing the voltage on the intermediate voltage bus to improve load transient response of the power conversion system.

4. The method of claim 1, further comprising:

detecting the plurality of operating parameters including a hotspot temperature of the first power conversion apparatus and a hotspot temperature of the second power conversion apparatus; and dynamically adjusting the voltage on the intermediate voltage bus so that the hotspot temperature of the first power conversion apparatus is equal to the hotspot temperature of the second power conversion apparatus.

5. The method of claim 1, further comprising:

detecting the plurality of operating parameters including a voltage on the input voltage bus, a current flowing through the input voltage bus, a voltage on the output voltage bus, a current flowing through the output voltage bus;

calculating efficiency of the power conversion system based on the plurality of operating parameters; and dynamically adjusting the voltage on the intermediate voltage bus to improve the efficiency of the power conversion system.

6. The method of claim 1, further comprising:

detecting the plurality of operating parameters including a voltage on the input voltage bus, a current flowing through the input voltage bus, a voltage on the output voltage bus, a current flowing through the output voltage bus;

calculating efficiency of the power conversion system based on the plurality of operating parameters;

dynamically adjusting the voltage on the intermediate voltage bus to improve the efficiency of the power conversion system; and in response to the voltage on the intermediate voltage bus rising to a level close to the voltage on the input voltage bus, configuring one power switch of the first power conversion apparatus to operate in a linear mode where the one power switch of the first power conversion apparatus functions as a variable resistor to regulate the voltage on the intermediate voltage bus.

7. The method of claim 1, further comprising:

detecting the plurality of operating parameters including a voltage on the input voltage bus, a current flowing through the input voltage bus, a voltage on the output voltage bus, a current flowing through the output voltage bus;

calculating efficiency of the power conversion system based on the plurality of operating parameters;

dynamically adjusting the voltage on the intermediate voltage bus to improve the efficiency of the power conversion system; and in response to the voltage on the intermediate voltage bus dropping to a level close to the voltage on the output voltage bus, configuring one power switch of the second power conversion apparatus to operate in a linear mode where the one power switch of the second power conversion apparatus functions as a variable resistor to regulate the voltage on the output voltage bus.

8. The method of claim 1, wherein the first power conversion apparatus is a hybrid switched capacitor converter comprising:

a first switch, a second switch, a third switch and a fourth switch connected in series between the input voltage bus and ground;

a flying capacitor connected between a common node of the first switch and the second switch, and a common node of the third switch and the fourth switch;

an inductor connected between a common node of the second switch and the third switch, and the intermediate voltage bus; and a capacitor connected between the intermediate voltage bus and ground.

9. The method of claim 1, wherein the second power conversion apparatus is a buck converter comprising:

a high-side switch and a low-side switch connected in series between the intermediate voltage bus and ground;

an output inductor connected between a common node of the high-side switch and the low-side switch, and the output voltage bus; and an output capacitor connected between the output voltage bus and ground.

10. A method comprising:

detecting a plurality of operating parameters of a power conversion system comprising a first power conversion apparatus and a second power conversion apparatus connected in cascade through an intermediate voltage bus; and dynamically adjusting a voltage on the intermediate voltage bus of the power conversion system based on the plurality of operating parameters to enhance at least one desirable circuit characteristic of the power conversion system, wherein during a load transient, the voltage on the intermediate voltage bus is dynamically adjusted in response to an increase in load, and a voltage increase on the intermediate voltage bus is equal to a load change multiplied by a predetermined coefficient.

11. The method of claim 10, wherein:

the first power conversion apparatus is connected between an input voltage bus and the intermediate voltage bus; and the second power conversion apparatus is connected between the intermediate voltage bus and an output voltage bus.

12. The method of claim 11, wherein:

a voltage on the input voltage bus is equal to about 48 V; and a voltage on the output voltage bus is in a range from about 0.6 V to about 1 V.

13. The method of claim 10, further comprising:

calculating efficiency of the power conversion system based on the plurality of operating parameters; and dynamically adjusting the voltage on the intermediate voltage bus to improve the efficiency of the power conversion system.

14. The method of claim 10, wherein:

the first power conversion apparatus is a hybrid switched capacitor converter comprising:

a first switch, a second switch, a third switch and a fourth switch connected in series between an input voltage bus and ground;

a flying capacitor connected between a common node of the first switch and the second switch, and a common node of the third switch and the fourth switch;

an inductor connected between a common node of the second switch and the third switch, and the intermediate voltage bus; and a capacitor connected between the intermediate voltage bus and ground; and the second power conversion apparatus is a buck converter comprising:

a high-side switch and a low-side switch connected in series between the intermediate voltage bus and ground;

an output inductor connected between a common node of the high-side switch and the low-side switch, and an output voltage bus; and an output capacitor connected between the output voltage bus and ground.

15. A power conversion system comprising:

a first power conversion apparatus connected between an input voltage bus and an intermediate voltage bus;

a second power conversion apparatus connected between the intermediate voltage bus and an output voltage bus; and a control circuit configured to:

detect a plurality of operating parameters of the power conversion system; and dynamically adjust a voltage on the intermediate voltage bus based on the plurality of operating parameters so as to improve at least one desirable circuit characteristic of the power conversion system, wherein during a load transient, the voltage on the intermediate voltage bus is dynamically adjusted in response to an increase in load, and a voltage increase on the intermediate voltage bus is equal to a load change multiplied by a predetermined coefficient.

16. The power conversion system of claim 15, wherein the control circuit is configured to:

detect the plurality of operating parameters including a voltage on the input voltage bus, a current flowing through the input voltage bus, a voltage on the output voltage bus, a current flowing through the output voltage bus;

calculate efficiency of the power conversion system based on the plurality of operating parameters; and dynamically adjust the voltage on the intermediate voltage bus in a trial-and-error approach to improve the efficiency of the power conversion system.

17. The power conversion system of claim 15, wherein:

the first power conversion apparatus is a hybrid switched capacitor converter comprising:

a first switch, a second switch, a third switch and a fourth switch connected in series between the input voltage bus and ground;

a flying capacitor connected between a common node of the first switch and the second switch, and a common node of the third switch and the fourth switch;

an inductor connected between a common node of the second switch and the third switch, and the intermediate voltage bus; and a capacitor connected between the intermediate voltage bus and ground; and the second power conversion apparatus is a buck converter comprising:

a high-side switch and a low-side switch connected in series between the intermediate voltage bus and ground;

an output inductor connected between a common node of the high-side switch and the low-side switch, and the output voltage bus; and an output capacitor connected between the output voltage bus and ground.

* * * * *